United States Patent
Shimada et al.

(10) Patent No.: US 11,165,377 B2
(45) Date of Patent: Nov. 2, 2021

(54) CONTROL DEVICE FOR STEPPING MOTOR AND CONTROL METHOD FOR STEPPING MOTOR

(71) Applicant: MINEBEA MITSUMI Inc., Nagano (JP)

(72) Inventors: Ayaka Shimada, Fukuroi (JP); Kazuo Takada, Kosai (JP); Kei Yamazaki, Ueda (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/973,932

(22) PCT Filed: May 23, 2019

(86) PCT No.: PCT/JP2019/020369
§ 371 (c)(1),
(2) Date: Dec. 10, 2020

(87) PCT Pub. No.: WO2019/244552
PCT Pub. Date: Dec. 26, 2019

(65) Prior Publication Data
US 2021/0249977 A1    Aug. 12, 2021

(30) Foreign Application Priority Data

Jun. 20, 2018 (JP) .............................. JP2018-117457

(51) Int. Cl.
*H02P 8/30* (2006.01)

(52) U.S. Cl.
CPC ....................................... *H02P 8/30* (2013.01)

(58) Field of Classification Search
CPC .. H02P 8/24; H02P 8/2013; H02P 8/01; H02P 21/00; H02P 21/2016; H02P 21/02;
(Continued)

(56) References Cited

U.S. PATENT DOCUMENTS 6,016,044 A * 1/2000 Holdaway ................. H02P 8/04
                                                                    318/696
9,257,928 B2   2/2016 Takada et al.
(Continued)

FOREIGN PATENT DOCUMENTS

JP    2015-035926 A    2/2015
JP    2016-127653 A    7/2016
(Continued)

OTHER PUBLICATIONS

International Search Report for corresponding International Application No. PCT/JP2019/020369 dated Jul. 30, 2019.
(Continued)

*Primary Examiner* — Antony M Paul
(74) *Attorney, Agent, or Firm* — Pearne & Gordon LLP

(57) ABSTRACT

A control device for a stepping motor capable of hold control that can smoothly reduce an excitation current at a rotation stopping time of the stepping motor is provided. A control device (10) for a stepping motor (20) causes an excitation current to flow in a plurality of coils to rotate a rotor. The control device (10) includes a driving circuit (40) that applies a driving voltage to the coils, and a control circuit (30) that controls the driving voltage. The control circuit (30) performs hold control to move the rotor to a predetermined stop position by changing a magnitude of the excitation current flowing in the coils so that the magnitude of the excitation current becomes close to a target current value that gradually decreases, in a hold time period at a rotation stopping time of the stepping motor (20). The control circuit (30) sets an operation mode of the driving circuit (40) at an operation mode corresponding to a comparison result of the magnitude of the excitation current and the target current value, of a plurality of operation modes, at each predetermined period in the hold time period. The plurality of operation modes include a charge mode to increase the (Continued)

excitation current and a first attenuation mode to attenuate the excitation current.

11 Claims, 15 Drawing Sheets

(58) Field of Classification Search
CPC ...... H02P 23/00; H02P 23/2013; H02P 23/01;
H02P 27/00; H02P 27/2013; H02P 27/01;
H02P 27/04; H02P 27/06; H02P 27/08;
H02P 2203/03; H02P 1/00; H02P 1/2013;
H02P 1/01; H02P 1/04; H02P 1/06; H02P
1/12; H02P 1/16; H02P 1/18; H02P 1/24;
H02P 1/26; H02P 1/265; H02P 1/28;
H02P 1/30; H02P 1/42; H02P 1/423;
H02P 1/46; H02P 1/465; H02P 3/00;
H02P 3/2013; H02P 3/01; H02P 3/025;
H02P 3/06; H02P 3/065; H02P 3/08;
H02P 3/18; H02P 6/00; H02P 6/005;
H02P 6/12; H02P 6/14; H02P 6/15; H02P
6/16; H02P 6/24; H02P 7/00; H02P 7/04;
H02P 7/29; H02P 8/00; H02P 8/30
See application file for complete search history.

(56) References Cited

U.S. PATENT DOCUMENTS

| 2015/0042258 | A1 | 2/2015 | Takada et al. |
| 2016/0218648 | A1 | 7/2016 | Hijikata |
| 2017/0373622 | A1 | 12/2017 | Hijikata |
| 2019/0190415 | A1 | 6/2019 | Hijikata |

FOREIGN PATENT DOCUMENTS

| JP | 2016-135077 A | 7/2016 |
| JP | 2018-038213 A | 3/2018 |

OTHER PUBLICATIONS

Written Opinion for corresponding International Application No. PCT/JP2019/020369 dated Jul. 30, 2019 and English translation.
International Preliminary Report on Patentability for corresponding International Application No. PCT/JP2019/020369 dated Dec. 22, 2020.

* cited by examiner

CONTROL DEVICE FOR STEPPING MOTOR AND CONTROL METHOD FOR STEPPING MOTOR

TECHNICAL FIELD

The present invention relates to a control device for a stepping motor and a control method for a stepping motor, and particularly relates to a control device for a stepping motor and a control method for a stepping motor that perform hold control to move a rotor to a predetermined position at a rotation stopping time of the stepping motor.

BACKGROUND ART

A stepping motor magnetizes a stator by causing an excitation current to flow in a plurality of coils to drive a rotor to rotate in each step. At a rotation stopping time of the stepping motor, in a hold time period, an excitation current for attracting the rotor in an unstable state after deceleration to a position (stop position) facing a predetermined stator is caused to flow in the coils, and the rotor is moved to the above described stop position to be a stable point.

Patent Literature 1 as follows describes stop control to gradually decrease an excitation current during a hold time period, concerning a motor control method at a rotation stopping time of a stepping motor. According to the control method like this, the rotor gradually moves to the stop position during the rotation stopping time of the stepping motor, and therefore it is possible to suppress generation of vibration and noise.

DOCUMENT LIST

Patent Literature

Patent Literature 1: Japanese Patent Application Publication No. 2015-35926

SUMMARY OF INVENTION

Technical Problem

Incidentally, even when the control method for a stepping motor as described in Patent Literature 1 is used, it is still desired to perform hold control that can smoothly reduce an excitation current while suppressing generation of vibration noise, impact noise and the like at the rotation stopping time of the stepping motor.

It is an object of the present invention to provide a control device for a stepping motor and a control method for a stepping motor capable of hold control that can smoothly reduce an excitation current at a rotation stopping time of the stepping motor.

Solution to Problem

In order to achieve the above described object, according to an aspect of the present invention, a control device for a stepping motor is a control device for a stepping motor that causes an excitation current to flow in a plurality of coils to rotate a rotor, and includes a driving circuit that includes a switching element and applies a driving voltage to the coils, and a control circuit that controls the driving voltage that is applied by the driving circuit, wherein the control circuit performs hold control to move the rotor to a predetermined stop position by changing a magnitude of the excitation current flowing in the coils so that the magnitude of the excitation current becomes close to a target current value that gradually decreases, in a hold time period at a rotation stopping time of the stepping motor, the control circuit sets an operation mode of the driving circuit at an operation mode corresponding to a comparison result of the magnitude of the excitation current and the target current value, of a plurality of operation modes, at each of predetermined periods in the hold time period, and the plurality of operation modes include a charge mode to increase the excitation current and a first attenuation mode to attenuate the excitation current.

Preferably, the control circuit sets the operation mode of the driving circuit at an operation mode corresponding to a predetermined condition, of the plurality of operation modes, when the comparison result of the magnitude of the excitation current and the target current value satisfies the predetermined condition in the hold time period.

Preferably, the control circuit sets the operation mode of the driving circuit at the charge mode in a case where the magnitude of the excitation current is smaller than the target current value, at each of the predetermined periods.

Preferably, the control circuit sets the operation mode of the driving circuit at the first attenuation mode in a case where the magnitude of the excitation current is larger than the target current value, at each of the predetermined periods.

Preferably, the control circuit sets the operation mode of the driving circuit at the first attenuation mode, when the magnitude of the excitation current reaches the target current value in a case where the operation mode of the driving circuit is the charge mode.

Preferably, the plurality of operation modes further include a second attenuation mode that attenuates the excitation current at a higher speed than the first attenuation mode.

Preferably, the control circuit sets the operation mode of the driving circuit at the second attenuation mode in a case where the magnitude of the excitation current is larger than the target current value, at each of the predetermined periods.

Preferably, the control circuit sets the operation mode of the driving circuit at the second attenuation mode in a case where the operation mode of the driving circuit is the first attenuation mode in an entire time period of a previous period, when the magnitude of the excitation current is larger than the target current value, at each of the predetermined periods, and sets the operation mode of the driving circuit at the first attenuation mode in a case where the operation mode of the driving circuit is the operation mode other than the first attenuation mode in a partial time period in a previous period.

Preferably, the control circuit sets the operation mode of the driving circuit at the second attenuation mode, when the magnitude of the excitation current becomes larger than the target current value by a predetermined value or more in the hold time period.

Preferably, the control circuit outputs a PWM (Pulse Width Modulation) signal to the driving circuit to perform control of the driving voltage, and the predetermined period is a PWM period of the PWM signal.

According to another aspect of the present invention, a control method for a stepping motor is a control method for a stepping motor that rotates a rotor by applying a driving voltage to a plurality of coils by a driving circuit including a switching element, and causing an excitation current to flow in the plurality of coils, and includes a normal control step of controlling the driving voltage at a normal driving time of the stepping motor, and a hold control step of performing hold control to move the rotor to a predetermined stop position by changing a magnitude of the excitation current flowing in the coils so that the magnitude of the excitation current becomes close to a target current value that gradually decreases, in a hold time period at a rotation stopping time of the stepping motor, wherein the hold control step causes the driving circuit to operate in an operation mode corresponding to a comparison result of the magnitude of the excitation current and the target current value, of a plurality of operation modes, at each of predetermined periods in the hold time period, and the plurality of operation modes include a charge mode to increase the excitation current and a first attenuation mode to attenuate the excitation current.

Effects of Invention

According to these inventions, it is possible to provide the control device for a stepping motor and the control method for a stepping motor capable of hold control that can smoothly reduce an excitation current at a rotation stopping time of the stepping motor.

DESCRIPTION OF EMBODIMENTS

Hereinafter, a control device for a stepping motor as an embodiment of the present invention will be described.

Embodiment

Figure 1:
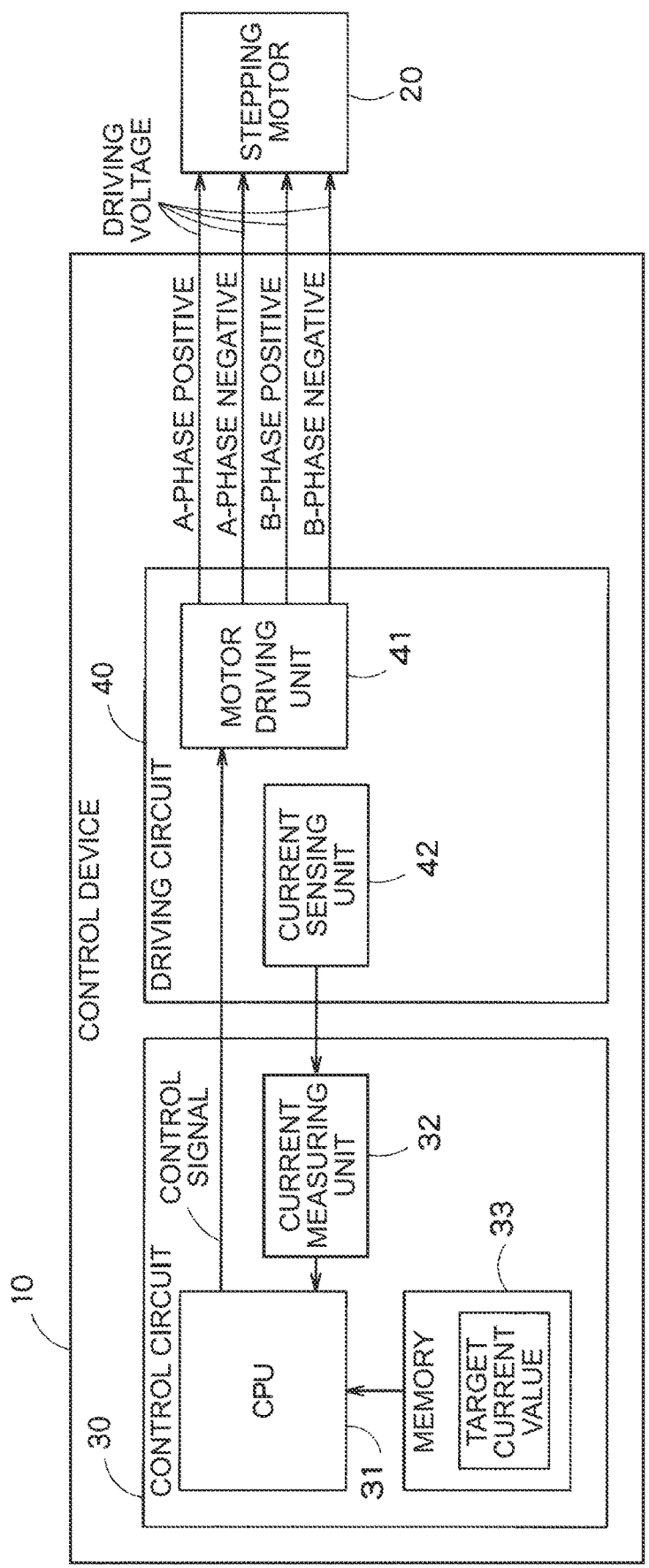
FIG. 1 is a block diagram showing a control device for a stepping motor in one of embodiments of the present invention.

FIG. 1 is a block diagram showing a control device for a stepping motor in one of embodiments of the present invention.

As shown in FIG. 1, a control device 10 supplies a driving voltage to a stepping motor 20, and drives the stepping motor 20.

The stepping motor 20 includes a rotor, a stator, and a plurality of coils 124 (shown by being simplified in FIG. 2) that are wound around the stator. The stepping motor 20 includes, for example, the coils 124 of two phases (that is, an A-phase coil and a B-phase coil). The control device 10 supplies a driving voltage to the stepping motor 20 through lines of an A-phase (positive), the A-phase (negative), a B-phase (positive) and the B-phase (negative), and the like. In the present embodiment, the stepping motor 20 is used as an actuator of an air-conditioner for automotive application, for example, but is not limited to this.

The control device 10 mainly includes a control circuit (one example of control unit, one example of hold control unit) 30 and a driving circuit (one example of driving unit) 40. The driving circuit 40 applies a driving voltage to the coils 124 of the stepping motor 20. The control circuit 30 controls the driving circuit 40, and controls the driving voltage that is applied by the driving circuit 40. In other words, the control device 10 rotates the rotor of the stepping motor 20 by applying the driving voltage to the plurality of coils 124 of the stepping motor 20, and causes an excitation current to flow in the coils 124.

The control circuit 30 has a CPU (Central Processing Unit) 31, a current measuring unit 32, and a memory 33. The driving circuit 40 has a motor driving unit 41 and a current sensing unit 42.

The current sensing unit 42 and the current measuring unit 32 detect an excitation current value flowing in each of the coils 124 of the stepping motor 20. More specifically, the current sensing unit 42 causes an excitation current to flow in a shunt resistor, for example, and detects a voltage drop at the shunt resistor. The current measuring unit 32 calculates the excitation current value of each of the coils 124 based on the voltage drop detected by the current sensing unit 42.

The CPU 31 generates a control signal for controlling a driving voltage and outputs the control signal to the motor driving unit 41. The CPU 31 generates the control signal and outputs the control signal such that, for example, the excitation current is in a predetermined sine waveform in a normal startup time of the stepping motor 20. In the present embodiment, the control signal is a digital signal of one bit with a pulse width modulated. In other words, the control circuit 30 outputs a PWM signal to the driving circuit 40 to perform control of the driving voltage.

The motor driving unit 41 applies the driving voltage to the coils 124 of the stepping motor 20 in accordance with a control signal supplied from the CPU 31. The driving voltage is applied to the coils 124 as a PWM signal.

When the driving voltage is applied to the coils 124 of the stepping motor 20 in this way, an excitation current flows in the coils 124 and the stator is magnetized. By alternately switching a direction of the excitation current that is caused to flow in the coils 124 of the two phases, magnetic poles that are excited by the stator change, and the rotor rotates.

Figure 2:
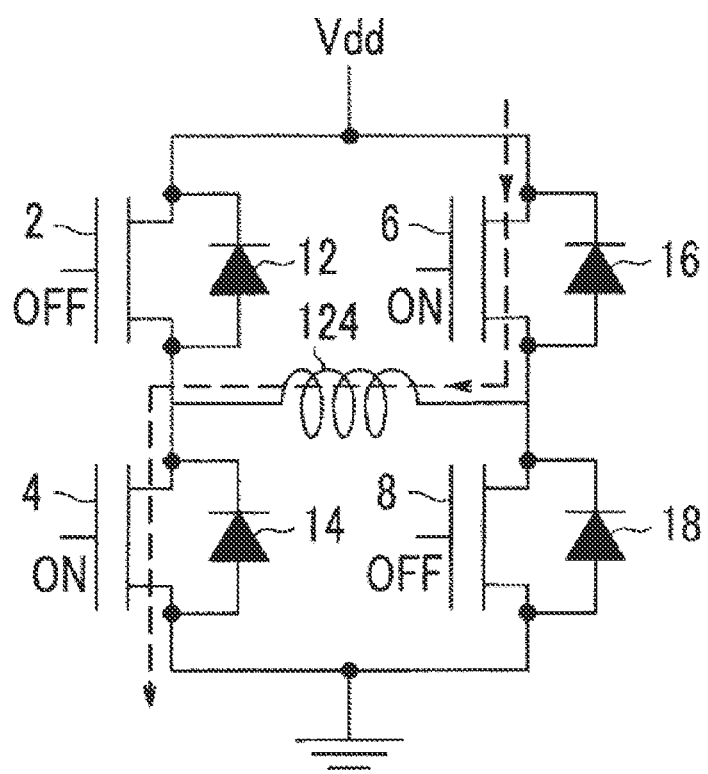
FIG. 2 is a diagram explaining a charge mode of an H bridge circuit.

Here, the driving circuit 40 has switching elements 2, 4, 6 and 8 (shown in FIG. 2 and the like). The switching elements 2, 4, 6, and 8 are provided in the motor driving unit 41. The switching elements 2, 4, 6 and 8 are, for example, FETs (field effect transistors), and form an H bridge circuit 45 (shown in FIG. 2 and the like) with the coils 124 of the stepping motor 20. A control signal supplied from the CPU 31 is inputted to gates of the respective switching elements 2, 4, 6 and 8, for example. The respective switching elements 2, 4, 6, and 8 are brought into an on state or an off state according to the control signal, and thereby the excitation current flowing into the coils 124 is controlled. Note that the H bridge circuit 45 is provided for each of the coils 124 of the two phases.

In the present embodiment, the CPU 31 performs hold control from a time point of starting stop of rotation of the stepping motor 20 at which normal driving of the stepping motor 20 ends until a time period determined in advance elapses, as described later. In other words, the CPU 31 performs hold control during a hold time period at the rotation stopping time of the stepping motor 20. The CPU 31 generates a control signal based on hold control to output the control signal to the motor driving unit 41. Here, the hold control is realized by, for example, the CPU 31 executing arithmetic processing in accordance with a program (not illustrated) stored in the memory 33 by using excitation current values of the respective coils 124 measured by the current measuring unit 32 and target current values stored in the memory 33.

FIG. 2 to FIG. 5 are diagrams explaining operation modes of the H bridge circuit 45.

As shown in FIG. 2 to FIG. 5, the switching elements 2 and 4 are connected in series, and a DC power supply and a ground wire are connected to the series circuit. Likewise, the switching elements 6 and 8 are also connected in series. A predetermined voltage Vdd is respectively applied to the switching elements 2 and 4, and the switching elements 6 and 8. Diodes 12, 14, 16 and 18 are diodes for a circular current, and are connected in parallel to the switching elements 2, 4, 6, and 8. Note that the switching elements 2, 4, 6 and 8 may be formed to use own parasitic diodes in place of the diodes for a circular current. Note that in the drawings, terminals at lower sides of the switching elements 2, 4, 6 and 8 are sources, and terminals at upper sides are drains.

The driving circuit 40 performs an operation in an operation mode set by the control circuit 30. The set operation mode is the operation mode determined by the control circuit 30, of a plurality of operation modes. The plurality of operation modes include a charge mode that increases the excitation current, and a low-speed attenuation mode (one example of a first attenuation mode) that attenuates the excitation current (decreases the excitation current). Note that in the present embodiment, the plurality of operation modes further include a high-speed attenuation mode (one example of a second attenuation mode) that attenuates the excitation current at a higher speed than the low-speed attenuation mode.

In the driving circuit 40 in which an operation mode is set, the switching elements 2, 4, 6 and 8 of the H bridge circuit 45 are respectively brought into an on state or an off state in a predetermined manner corresponding to the operation mode. In other words, bringing the switching elements 2, 4, 6 and 8 of the H bridge circuit 45 respectively into the on state or the off state in the predetermined manner can be rephrased as performing setting of the operation mode. Setting of the operation mode is performed by outputting a control signal from the control circuit 30 to the driving circuit 40.

FIG. 2 is a diagram explaining the charge mode of the H bridge circuit 45. As shown in FIG. 2, when an absolute value of the excitation current flowing in the coils 124 is increased, the driving circuit 40 is set to the charge mode, for example, the switching elements 4 and 6 that diagonally face each other are brought into the on state, and the other switching elements 2 and 8 are brought into the off state. In this state, the excitation current flows in a direction shown by a broken line through the switching element 6, the coils 124 and the switching element 4, and the excitation current increases.

Figure 3:
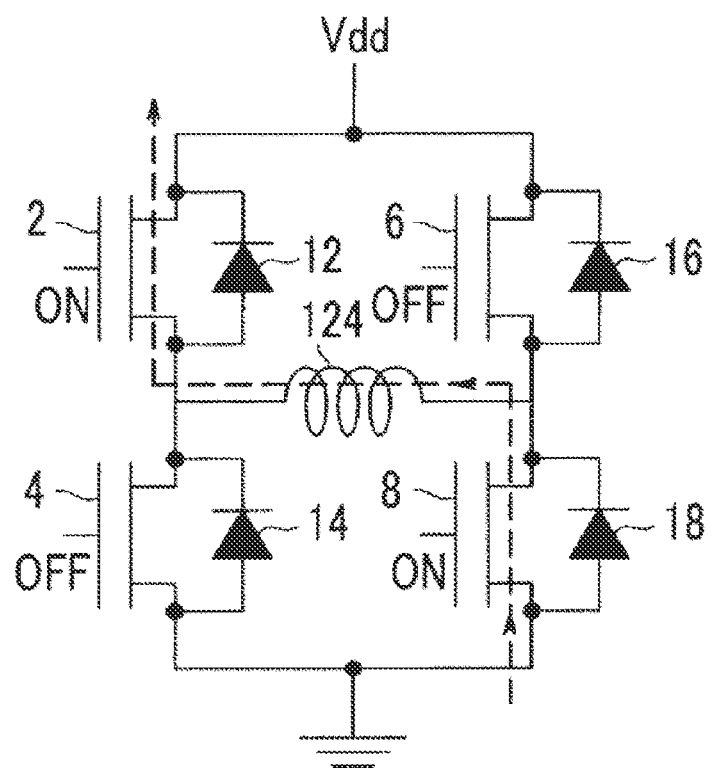
FIG. 3 is a diagram explaining a high-speed attenuation mode of the H bridge circuit.

FIG. 3 is a diagram explaining the high-speed attenuation mode of the H bridge circuit 45.

As illustrated in FIG. 3, when the absolute value of the excitation current flowing in the coils 124 is attenuated at a high speed, the driving circuit 40 is set to the high-speed attenuation mode, the switching elements 4 and 6 that diagonally face each other are brought into the off state, and the switching elements 2 and 8 are brought into the on state, as opposed to the charge mode just before. Since a back electromotive force is generated in the coils 124, the current flows in a direction shown by a broken line through the switching element 8, the coils 124, and the switching element 2, and the excitation current attenuates at a high speed.

Figure 4:
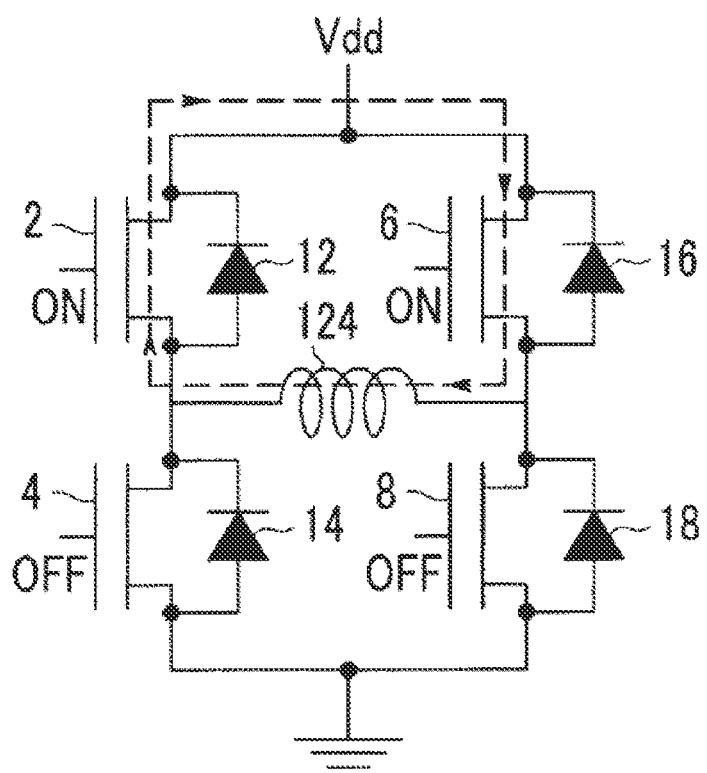
FIG. 4 is a diagram explaining a low-speed attenuation mode of the H bridge circuit.

FIG. 4 is a diagram explaining a low-speed attenuation mode of the H bridge circuit 45.

As shown in FIG. 4, when the absolute value of the excitation current flowing in the coils 124 is attenuated at a lower speed than in the high-speed attenuation mode, the driving circuit 40 is set to the low-speed attenuation mode, the switching elements 2 and 6 at a voltage Vdd side are brought into the on state, and the switching elements 4 and 8 at a ground side are brought into the off state. In doing so, a current that loops the switching elements 2 and 6 and the coils 124 flows, as an illustrated broken line. The current attenuates by impedances of the switching elements 2 and 6 and the coils 124. An attenuation speed at this time is a lower speed than in the above described high-speed attenuation mode. In other words, the low-speed attenuation mode is an operation mode that attenuates the excitation current at a lower speed than in the high-speed attenuation mode.

Figure 5:
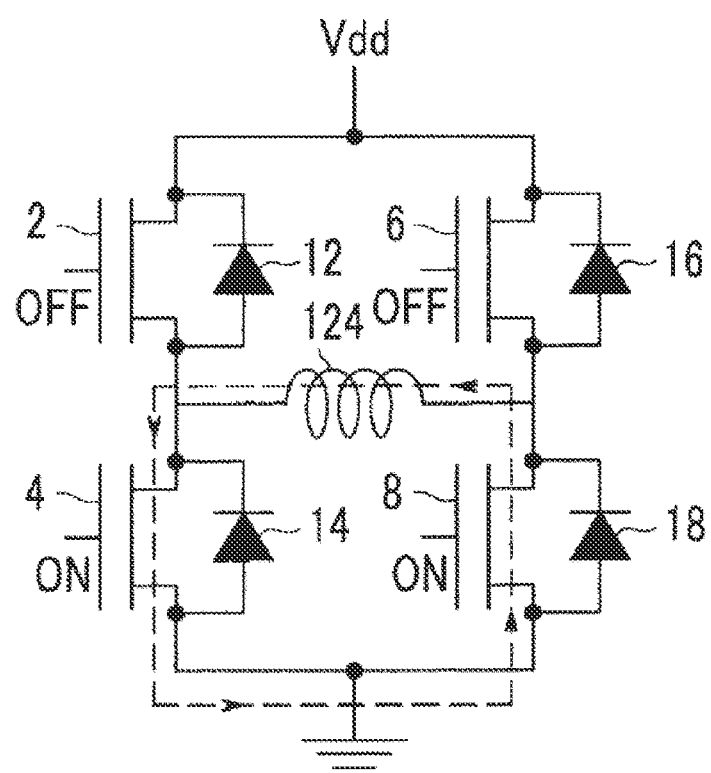
FIG. 5 is a diagram explaining a variation of the low-speed attenuation mode of the H bridge circuit.

FIG. 5 is a diagram explaining a variation of the low-speed attenuation mode of the H bridge circuit 45.

When the absolute value of the excitation current flowing in the coils 124 is attenuated at a lower speed than in the high-speed attenuation mode, the driving circuit 40 may be set to a low-speed attenuation mode that operates the H bridge circuit 45 as shown in FIG. 5 (variation of the low-speed attenuation mode). In the variation of the low-speed attenuation mode, the switching elements 2 and 6 at the voltage Vdd side are brought into the off state, and the switching elements 4 and 8 at the ground side are brought into the on state. In doing so, the excitation current that loops the switching elements 4 and 8 and the coils 124 flows as an illustrated broken line. The current attenuates by impedances of the switching elements 4 and 8 and the coils 124. An attenuation speed at this time is a lower speed than in the above described high-speed attenuation mode.

Note that as the operation mode that the driving circuit 40 can adopt, a penetration protection mode that brings all of the switching elements 2, 4, 6 and 8 are brought into the off state, or brings gate voltages of three of the switching elements 2, 4, 6 and 8 are brought into the off state may be included.

The control circuit 30 controls the driving voltage by outputting the control signal as described above at a normal driving time of the stepping motor 20 (normal control step). Further, the control circuit 30 performs hold control to change a magnitude of the excitation current flowing in the coils 124 so that the magnitude of the excitation current approaches a target current value that gradually decreases, and move the rotor to a predetermined stop position in the hold time period at the rotation stopping time of the stepping motor 20 (hold control step). In other words, the hold control is control that gradually decreases the magnitude of the excitation current to move the rotor to the predetermined stop position, in the hold time period at the rotation stopping time.

Figure 6:
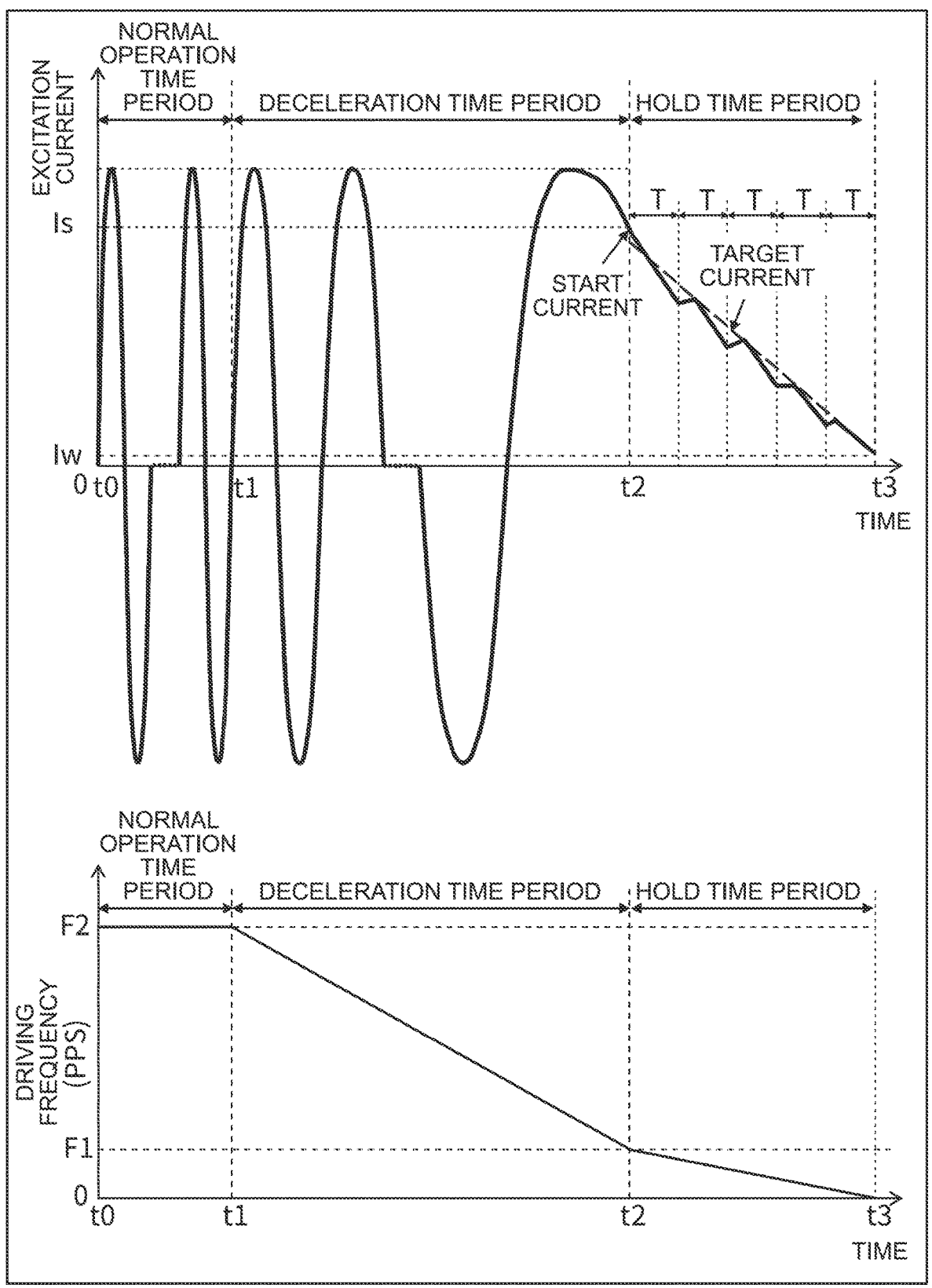
FIG. 6 is a diagram explaining control that is performed at a rotation stopping time of the stepping motor.

FIG. 6 is a diagram explaining control that is performed at the rotation stopping time of the stepping motor 20.

In FIG. 6, a graph on an upper tier shows a transition of a magnitude of the excitation current, and a graph on a lower tier shows a speed, that is, a driving frequency (PPS (pulse per second)) of the stepping motor 20.

In FIG. 6, in the normal driving time (normal operation time period) from a time t0 to a time t1, a driving voltage is applied so that the driving frequency becomes F2. At this time, the excitation current flows alternately in positive and negative.

When control to stop the rotation of the stepping motor 20 is started at the time t1, a deceleration time period is from the t1 to a time t2 after a predetermined time. In the deceleration time period, the driving frequency is controlled to gradually decrease to reach a predetermined value F1 at the time t2 (end time of the deceleration time period). At this time, the excitation current flows alternately in positive and negative, but a period thereof gradually increases. Control is performed so that the excitation current value becomes a predetermined start current value Is at the time t2.

At the time t2, hold control is performed in a hold time period from the time t2 to a time t3 after a predetermined time. By the hold control being performed, the excitation current value gradually decreases from the start current value Is (time t2) to a predetermined standby current value Iw (time t3). Further, by the hold control being performed, the driving frequency gradually decreases from the predetermined value F1. At the time t3, the driving frequency becomes zero, and the rotor stops rotation at a predetermined position at this time.

In the hold control, the excitation current value decreases substantially linearly from the start current value Is to the standby current value Iw by control of the control circuit 30. The control circuit 30 changes the magnitude of the excitation current so that the magnitude of the excitation current becomes close to a target current value that gradually decreases linearly from the start current value Is to the standby current value Iw. The hold control to reduce the excitation current smoothly like this is performed, whereby it is possible to suppress generation of sound and vibration at the rotation stopping time of the stepping motor 20.

In the present embodiment, the target current value is set so that the current linearly decreases with a lapse of time, so that the excitation current value takes the start current value Is at the time of start of the hold time period at the rotation stopping time of the stepping motor 20, and takes the standby current value Iw at the time of end of the hold time period. In other words, control is performed so that timing at which the excitation current value reaches the standby current value Iw, and timing of end of the hold time period become same. The target current value in the hold control is also stored in the memory 33, for example.

Note that in the present embodiment, the start current value Is is set within a range between 30% to 100% of a maximum value of the excitation current (maximum value of the excitation current that is caused to flow in the coils 124 before entering the hold time period at the rotation stopping time). For example, a case where the start current value Is at a start time (starting time of stop of rotation) is set at a value of 70% of the maximum value of the excitation current is assumed. At this time, at the time t2 that is the start time of the hold time period at the rotation stopping time of the stepping motor 20, control is performed so that the excitation current value abruptly decreases from the excitation current value up to this time (value of 100% of the maximum value of the excitation current) to the start current value Is. Thereafter, in the hold time period from the time t2 to the time t3, control is performed so that the excitation current value gradually reduces (decreases) from the value of 70% of the maximum value of the excitation current until the excitation current value reaches the standby current value Iw. When the excitation current value reaches the standby current value Iw and the hold time period at the rotation stopping time ends, stop of the rotation of the stepping motor 20 is completed. Since the start current value Is is set in the range like this, it is possible to attract the motor to the stop position reliably during the hold control.

Here, the control circuit 30 is configured to perform the aforementioned hold control by changing the operation mode of the driving circuit 40 in accordance with a predetermined condition in the hold time period. Specifically, in the hold time period, the control circuit 30 sets the operation mode of the driving circuit 40 at an operation mode corresponding to a comparison result of the magnitude of the excitation current and the target current value, of the plurality of operation modes at each predetermined period (first setting operation). Further, in the hold time period, the control circuit 30 sets the operation mode of the driving circuit 40 at an operation mode corresponding to a predetermined condition, of the plurality of operation modes, when the comparison result of the magnitude of the excitation current and the target current value satisfies the predetermined condition (second setting operation).

More specifically, in the present embodiment, the control circuit 30 performs the following operation as the first setting operation. In other words, the control circuit 30 sets the operation mode of the driving circuit 40 at the charge mode when the magnitude of the excitation current is smaller than the target current value, at each predetermined period. Further, when the magnitude of the excitation current is larger than the target current value, the control circuit 30 sets the operation mode of the driving circuit 40 at the low-speed attenuation mode, at each predetermined period.

Further, the control circuit 30 performs an operation as follows as the second setting operation, in the hold time period. In other words, the control circuit 30 sets the operation mode of the driving circuit 40 at the low-speed attenuation mode, when the magnitude of the excitation current reaches the target current value when the operation mode of the driving circuit 40 is the charge mode.

Note that in the present embodiment, a predetermined period T at which the first setting operation is performed is a PWM period of the PWM signal. In FIG. 6 and the following drawings, the period T is schematically shown.

Figure 7:
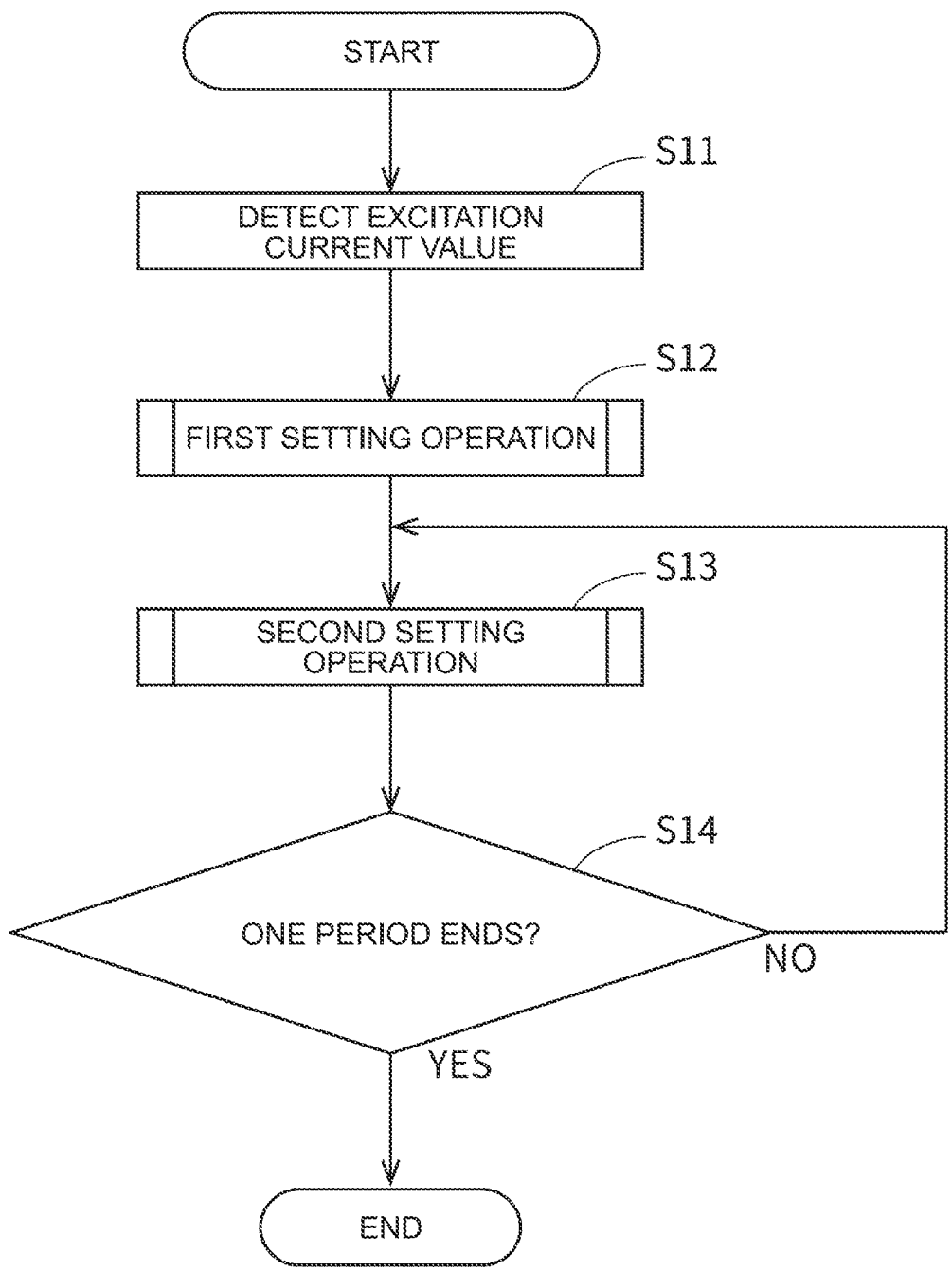
FIG. 7 is a flowchart explaining one example of hold control of a control circuit.

FIG. 7 is a flowchart explaining one example of the hold control of the control circuit 30.

In FIG. 7, a processing operation of the control circuit 30 that is performed during the period T, that is, one period of the PWM signal is shown. In other words, when a new PWM period starts in the hold time period, processing shown in FIG. 7 is started.

In step S11, the control circuit 30 detects the excitation current value. In other words, the current measuring unit 32 calculates the excitation current value.

In step S12, the control circuit 30 performs the first setting operation as described later. Thereby, the operation mode of the driving circuit 40 is set by the control circuit 30.

In step S13, the control circuit 30 performs a second setting operation as described later.

In step S14, the control circuit 30 determines whether or not one period of the PWM period ends. When one period of the PWM period ends, the control circuit 30 ends series of processing. When one period of the PWM period does not end, the control circuit 30 returns to step S13.

The processing shown in FIG. 7 like this is repeatedly performed at each PWM period until the hold time period ends.

Note that in the present embodiment, a length of the hold time period at the rotation stopping time of the stepping motor 20 is determined in advance. The length of the hold time period can be properly set with consideration given to a time required until the rotor moves to the stop position and vibration subsides.

Figure 8:
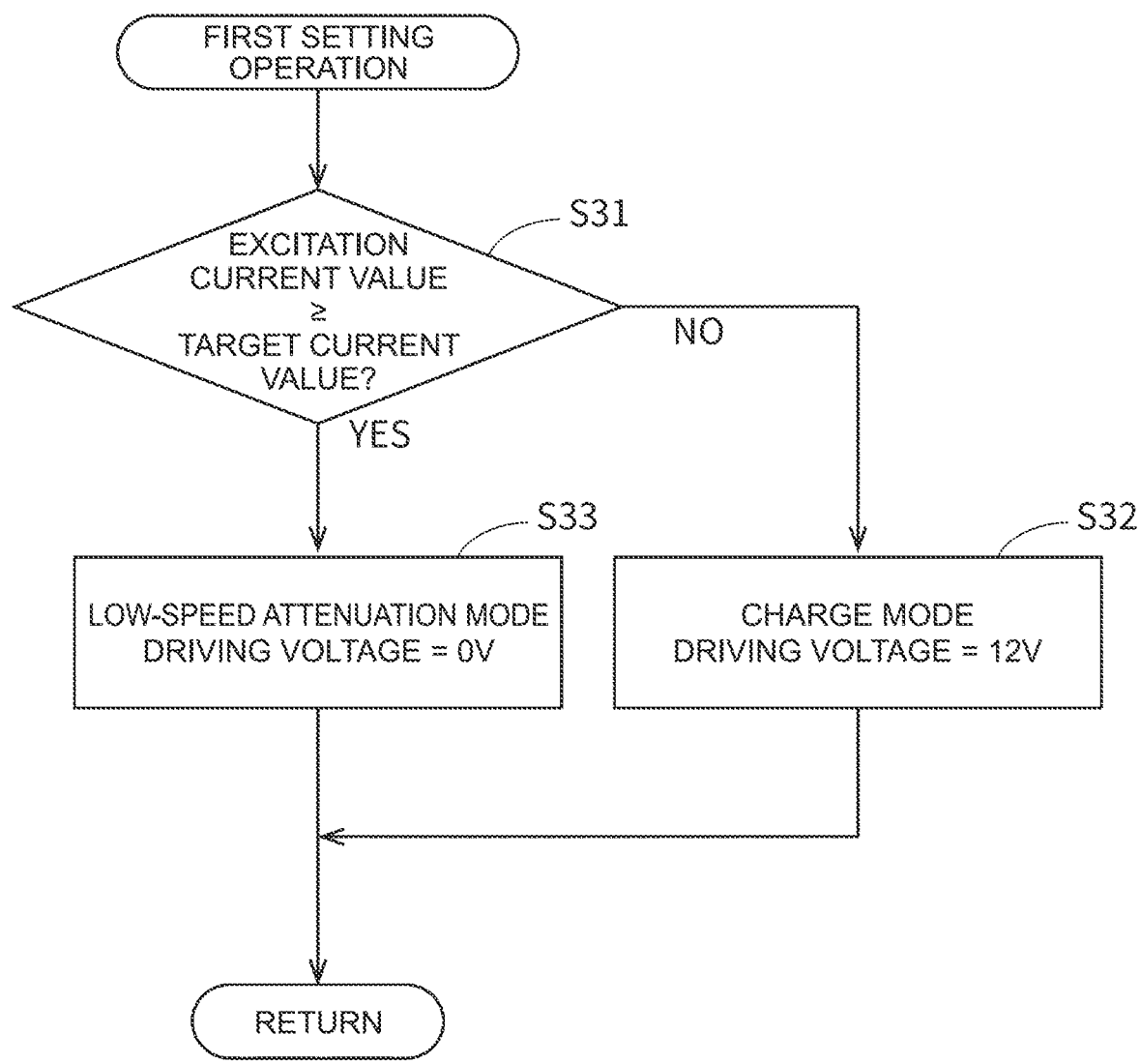
FIG. 8 is a flowchart showing one example of a first setting operation.

FIG. 8 is a flowchart showing one example of the first setting operation.

As illustrated in FIG. 8, in the first setting operation, in step S31, the control circuit 30 determines whether or not the excitation current value calculated in the current measuring unit 32 is a target current value at this time point that is stored in the memory 33 or more. In other words, the control circuit 30 compares the excitation current value and the target current value. When the excitation current value is the target current value or more (YES), the control circuit 30 proceeds to step S33, and when the excitation current value is not the target current value or more (NO), the control circuit 30 proceeds to step S32.

In step S32, the control circuit 30 sets the operation mode of the driving circuit 40 at the charge mode. In other words, the driving voltage that is applied to the coils 124 by the driving circuit 40 is made a predetermined voltage (for example, 12 volts).

On the other hand, in step S33, the control circuit 30 sets the operation mode of the driving circuit 40 at the low-speed attenuation mode. In other words, the driving voltage that is applied to the coils 124 by the driving circuit 40 is made zero volts.

When step S32 or step S33 ends, the first setting operation ends. The first setting operation is performed at each PWM period.

Figure 9:
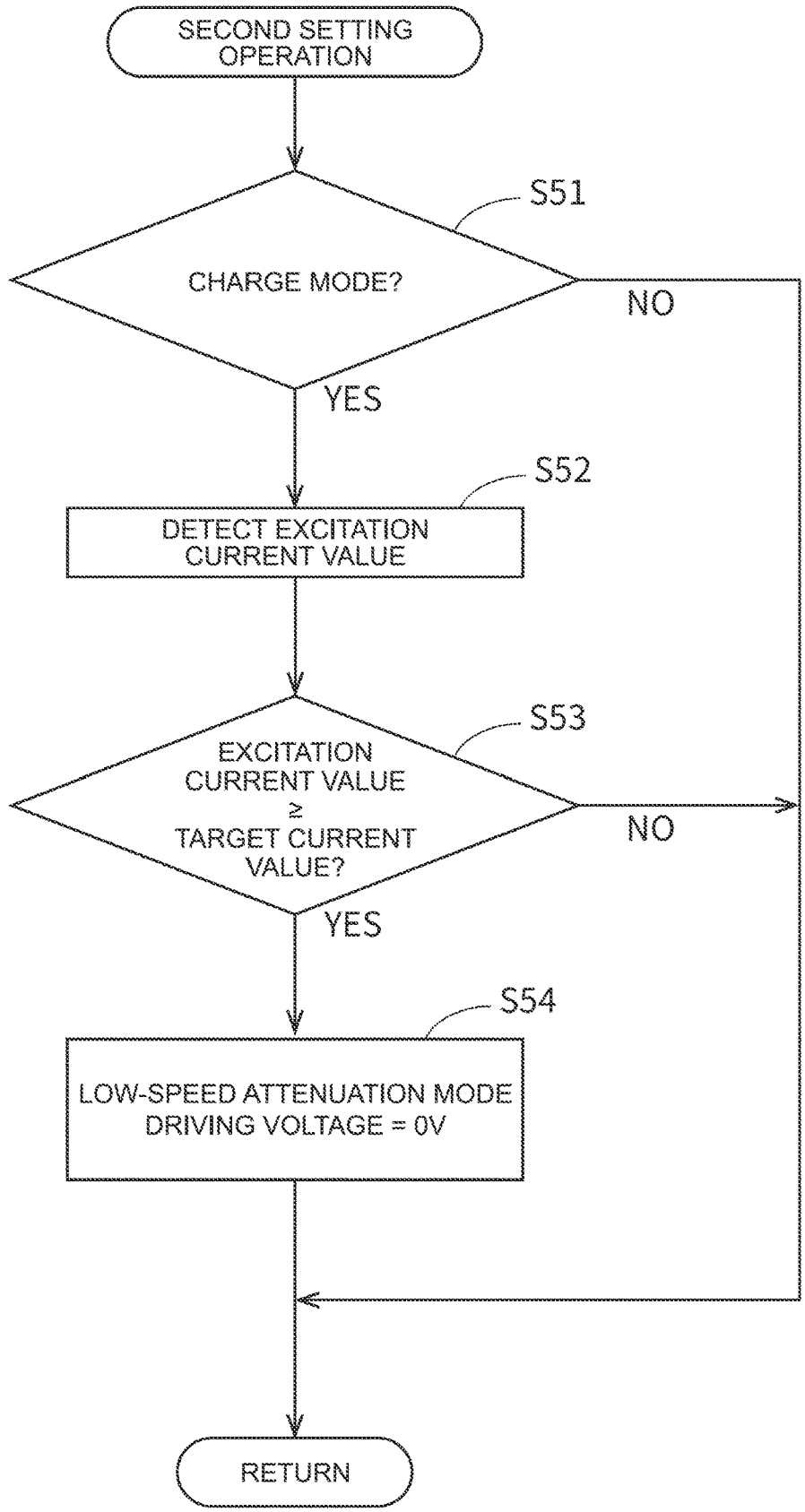
FIG. 9 is a flowchart showing one example of a second setting operation.

FIG. 9 is a flowchart showing one example of the second setting operation.

As shown in FIG. 9, in the second setting operation, in step S51, the control circuit 30 determines whether or not the operation mode of the driving circuit 40 is the charge mode. When the operation mode of the driving circuit 40 is the charge mode (YES), the control circuit 30 proceeds to step S52, and when the operation mode of the driving circuit 40 is not the charge mode (NO), the control circuit 30 ends the second setting operation. In other words, it can also be said that setting of the operation mode of the driving circuit 40 by the second setting operation is performed when the operation mode of the driving circuit 40 is the charge mode.

In step S52, the control circuit 30 detects the excitation current value.

In step S53, the control circuit 30 determines whether or not the excitation current value is the target current value at this time point that is stored in the memory 33 or more. In other words, the control circuit 30 compares the excitation current value and the target current value. When the excitation current value is the target current value or more (YES), the control circuit 30 proceeds to step S54, and when the excitation current value is not the target current value or more (NO), the second setting operation ends.

In step S54, the control circuit 30 sets the operation mode of the driving circuit 40 at the low-speed attenuation mode. That is to say, the driving voltage that is applied to the coils 124 by the driving circuit 40 is made zero volts.

Figure 10:
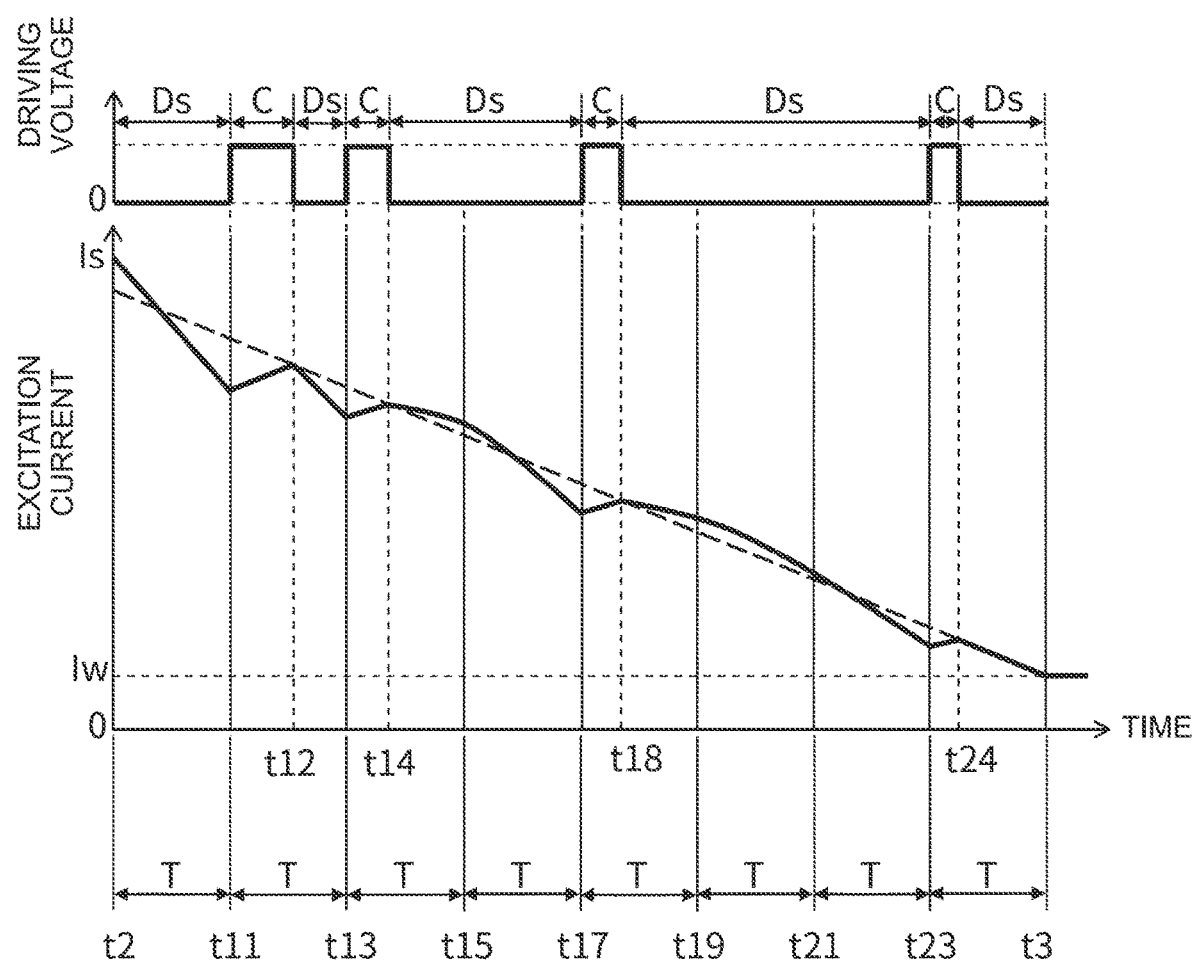
FIG. 10 is a diagram showing one example of an operation of the control device at a time of the hold control being performed.

FIG. 10 is a diagram showing one example of the operation of the control device 10 at the time of the hold control being performed.

In FIG. 10, a transition of the excitation current in the hold time period from a time t2 to a time t3 is schematically shown. The control circuit 30 changes the magnitude of the excitation current so that the magnitude of the excitation current becomes close to a target current value (shown by a broken line) that gradually decreases linearly from the start current value Is to the standby current value Iw. In FIG. 10, each of respective time periods from the time t2 to a time t11, from the time t11 to a time t13, from the time t13 to a time t15, from the time t15 to a time t17, from the time t17 to a time t19, from the time t19 to a time t21, from the time t21 to a time t23, and from the time t23 to the time t3 corresponds to a time (period T) of one period of the PWM period.

At the time t2, the excitation current value is larger than the target current value, and therefore the operation mode of the driving circuit 40 is a low-speed attenuation mode (one example of the first attenuation mode) Ds. Since the driving voltage is not applied until the time t11 at which the PWM period ends, the excitation current value decreases.

At the time t11, the excitation current value is smaller than the target current value, and therefore the operation mode of the driving circuit 40 is a charge mode C. In that case, the driving voltage is applied to the coils 124, and the excitation current value increases.

At a time t12 after the time t11 and before the time t13, the excitation current value reaches the target current value. In that case, the operation mode of the driving circuit 40 becomes the low-speed attenuation mode Ds. Thereafter, the driving voltage is not applied until the time t13 at which the PWM period ends, and therefore the excitation current value decreases.

At the time t13, the excitation current value is also smaller than the target current value, and the charge mode C is set. Subsequently, when the excitation current value reaches the target current value at a time t14 after the time t13 and before the time t15, the operation mode of the driving circuit 40 becomes the low-speed attenuation mode Ds.

At the time t15, the excitation current value is larger than the target current value, and therefore, the operation mode of the driving circuit 40 becomes the low-speed attenuation mode Ds. Since the driving voltage is not applied until the time t17 at which the PWM period ends, the excitation current value decreases.

At the time t17, the excitation current value is smaller than the target current value, and therefore the operation mode of the driving circuit 40 becomes the charge mode C. In that case, the driving voltage is applied, and the excitation current value increases. When the excitation current value reaches the target current value at a time t18 after the time t17 and before the time t19, the operation mode of the driving circuit 40 is made the low-speed attenuation mode Ds. Thereafter, the excitation current value is larger than the target current value at the time t19 and the time t21 at which the subsequent PWM periods are started, and therefore the operation mode of the driving circuit 40 is kept to be the low-speed attenuation mode Ds.

Thereafter, when the excitation current value becomes smaller than the target current value at the time t23, the charge mode C is set. Subsequently, when the excitation current value reaches the target current value at a time t24 after the time t23 and before the time t3, the operation mode of the driving circuit 40 becomes the low-speed attenuation mode Ds.

When the time t3 arrives thereafter, the hold time period ends. That is to say, at this time, the target current value declines to the standby current value Iw, and the excitation current value also becomes close to the standby current value Iw. After the time t3, the hold control ends, and control is performed so that the standby current value Iw flows in the coils 124.

In this way, the hold control is performed so that the excitation current gradually decreases with the lapse of time, by the control of the control circuit 30. In the hold time period, the target current value that gradually decreases with the lapse of time and the excitation current value are compared, and the operation mode of the driving circuit 40 is switched between the low-speed attenuation mode Ds and the charge mode C, so that in a broad way, the driving voltage with a pulse width modulated and a duty ratio (Duty) ratio decreasing with the lapse of time is applied to the coils 124.

Figure 11:
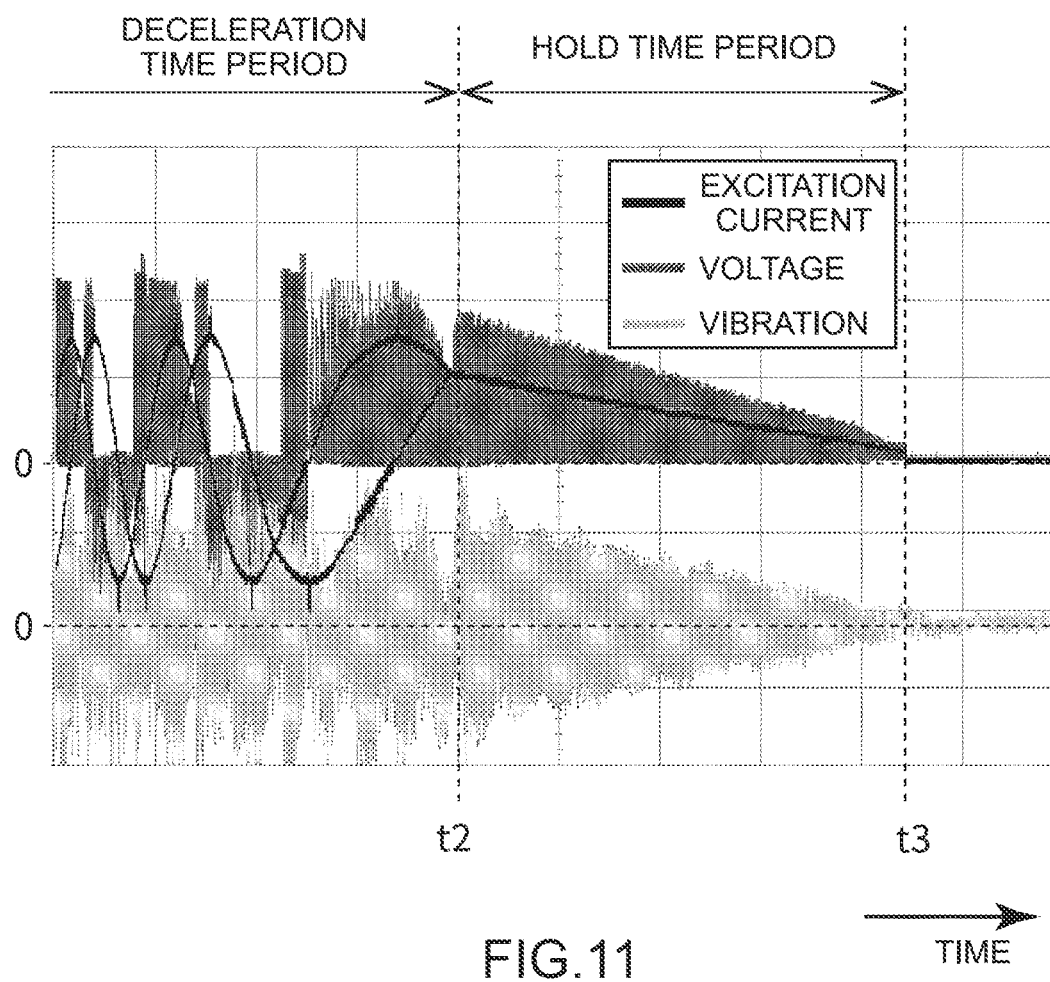
FIG. 11 is a diagram showing one example of a transition of an excitation current at the rotation stopping time of the stepping motor.

FIG. 11 is a diagram showing one example of a transition of the excitation current at the rotation stopping time of the stepping motor 20.

In FIG. 11, a transition of the driving voltage, and a transition of vibration generated in the stepping motor 20 are shown with the transition of the excitation current. In FIG. 11, data that is assumed is shown instead of an actual measurement result itself.

As shown in FIG. 11, when entering the hold time period from the deceleration time period, the excitation current gradually decreases, and becomes substantially zero at a time t3 at which the hold time period ends. With this, the magnitude of the driving voltage gradually decreases. Further, it is found that the vibration of the stepping motor 20 also gradually decreases.

In the present embodiment, the control device 10 is configured as above, and therefore it is possible to perform the hold control that can reduce the excitation current smoothly when the rotation of the stepping motor 20 stops. That is to say, at the time of start of each of the PWM periods, the target current value and the excitation current value are compared and the operation mode of the driving circuit 40 is set based on the comparison result, whereas during each of the PWM periods, the operation mode of the driving circuit 40 is set at the low-speed attenuation mode Ds when the excitation current increases by the charge mode and thereby the excitation current value reaches the target current value. Thus it is possible to decrease the excitation current value along the target current value that gradually decreases with the lapse of time, and it is possible to reduce the excitation current smoothly. Consequently, it is possible to suppress generation of vibration and noise at the rotation stopping time of the stepping motor 20.

Explanation of Modifications

In the aforementioned embodiment, at the rotation stopping time of the stepping motor 20, the control circuit 30 may set the operation mode of the driving circuit 40 at the high-speed attenuation mode according to a situation. For example, when the magnitude of the excitation current is larger than the target current value, the control circuit 30 may set the operation mode of the driving circuit 40 at the high-speed attenuation mode, at each predetermined period.

Further, when performing the hold control, the control circuit 30 may set the operation mode of the driving circuit 40 by properly switching the operation mode among the high-speed attenuation mode, the low-speed attenuation mode, and the charge mode.

Figure 12:
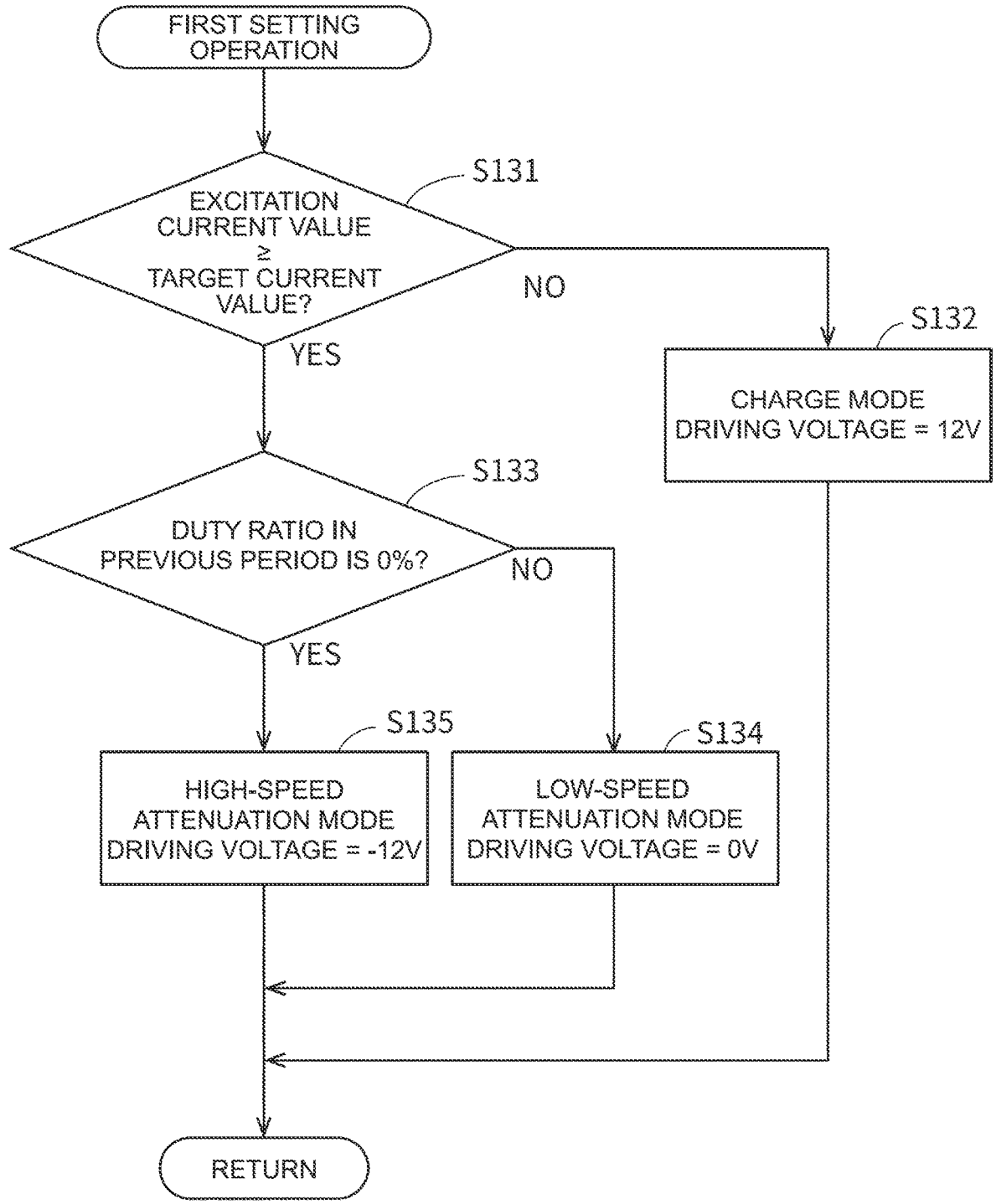
FIG. 12 is a flowchart showing a first setting operation according to a first modification of the present embodiment.

FIG. 12 is a flowchart showing a first setting operation according to a first modification of the present embodiment.

In the present modification, when a magnitude of an excitation current is larger than a target current value, a control circuit 30 performs control as follows at each predetermined period. That is to say, in a case where an operation mode of a driving circuit 40 is a low-speed attenuation mode in an entire time period of a previous period, the control circuit 30 sets the operation mode of the driving circuit 40 at a high-speed attenuation mode. On the other hand, when the operation mode of the driving circuit 40 is an operation mode other than the low-speed attenuation mode in a partial time period in the previous period, the control circuit 30 sets the operation mode of the driving circuit 40 at the low-speed attenuation mode.

In FIG. 12, processing in step S131 and step S132 is similar to the processing in step S31 and step S32 in FIG. 8 described above. In other words, in step S131, the control circuit 30 determines whether or not the excitation current value is the target current value or more at this time point. When the excitation current value is the target current value or more (YES), the control circuit 30 proceeds to step S133, and when the excitation current value is not the target current value or more (NO), the control circuit 30 proceeds to step S132.

In step S132, the control circuit 30 sets the operation mode of the driving circuit 40 at a charge mode. In other words, the driving voltage that is applied to the coils 124 by the driving circuit 40 is made a predetermined voltage (for example, 12 volts).

In step S133, the control circuit 30 determines whether or not a duty ratio (Duty) is 0% in the previous PWM period, that is, whether or not the driving circuit 40 is in the low-speed attenuation mode in the entire time period of the previous PWM period. When the duty ratio is 0% (YES), the control circuit 30 proceeds to step S135, and when the duty ratio is not 0% (NO), the control circuit 30 proceeds to step S134.

In step S134, the control circuit 30 sets the operation mode of the driving circuit 40 at the low-speed attenuation mode. In other words, the driving voltage that is applied to the coils 124 by the driving circuit 40 is made zero volts.

On the other hand, in step S135, the control circuit 30 sets the operation mode of the driving circuit 40 at the high-speed attenuation mode. In other words, the driving voltage that is applied to the coils 124 by the driving circuit 40 is made minus 12 volts.

When the processing in step S132, step S134, or step S135 ends, the first setting operation ends.

Figure 13:
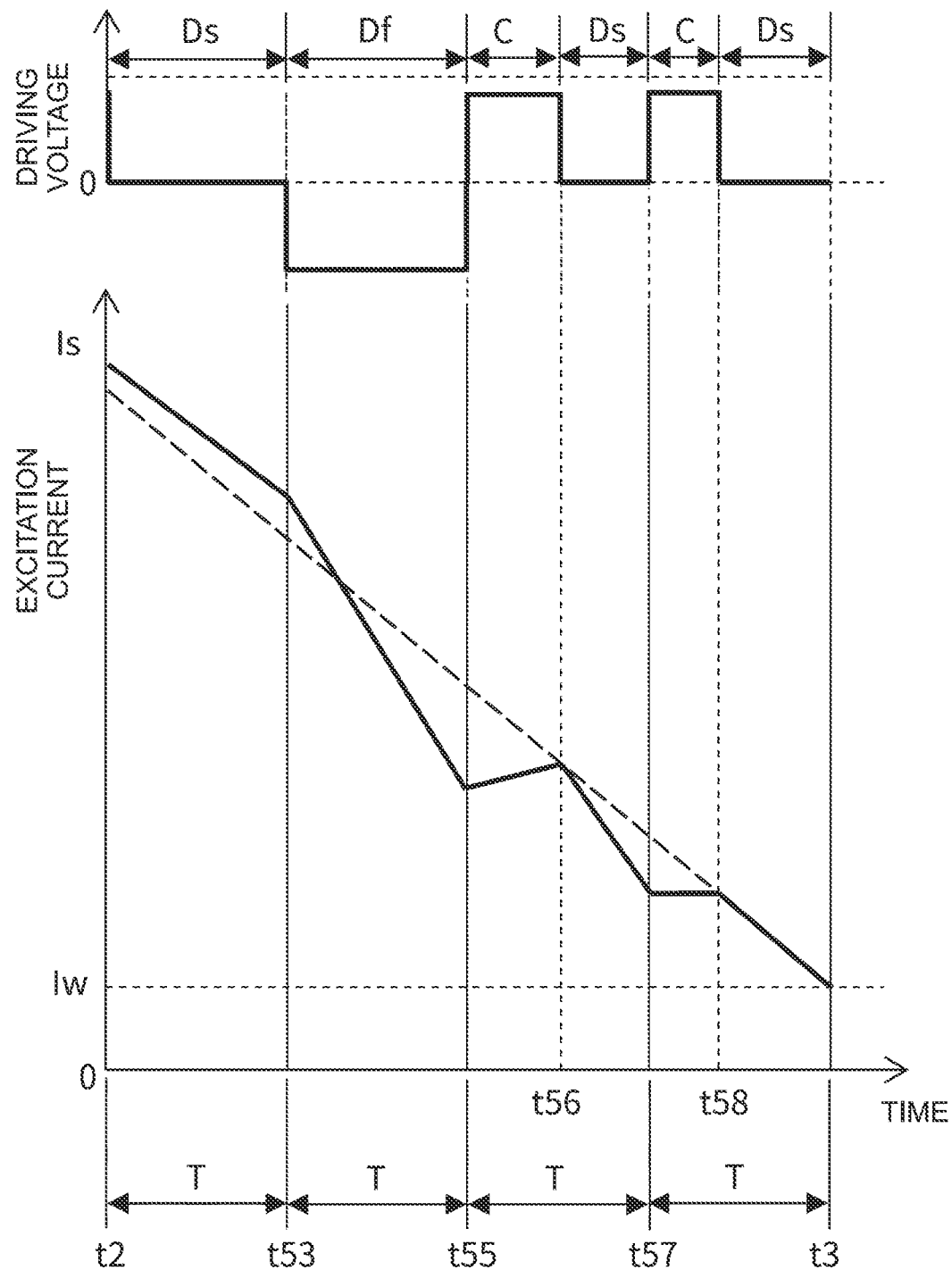
FIG. 13 is a diagram showing an operation of a control device at a time of hold control being performed in the first modification.

FIG. 13 is a diagram showing an operation of the control device 10 at the time of the hold control being performed in the first modification.

In FIG. 13, a transition of the excitation current in the hold time period from a time t2 to a time t3 is schematically shown. The control circuit 30 changes a magnitude of the excitation current so that the magnitude of the excitation current becomes close to a target current value shown by a broken line. In FIG. 13, each of time periods from the time t2 to a time t53, from the time t53 to a time t55, from the time t55 to a time t57, and from the time t57 to the time t3 is a time (period T) of one period of the PWM period. Note that it is assumed that in the first modification, a second setting operation is performed in a same way as in the aforementioned embodiment.

At the time t2, the excitation current value is larger than the target current value, and therefore the operation mode of the driving circuit 40 is a low-speed attenuation mode (one example of the first attenuation mode) Ds. The driving voltage is not applied until the time t53 at which the PWM period ends, and the excitation current value decreases.

At the time t53, the excitation current value is larger than the target current value. At this time, a duty ratio during a previous PWM period, that is, in the period from the time t2 to the time t53 is 0%. Consequently, the control circuit 30 sets the operation mode of the driving circuit 40 at a high-speed attenuation mode (one example of the second attenuation mode) Df. In that case, a negative driving voltage is applied to the coils 124, and the excitation current value decreases more abruptly than in the case of the low-speed attenuation mode Ds.

At the time t55, the excitation current value is smaller than the target current value. Therefore, a charge mode C is set. Subsequently, when the excitation current value reaches the target current value at a time t56 after the time t55 and before the time t57, the operation mode of the driving circuit 40 becomes the low-speed attenuation mode Ds.

Thereafter, when the excitation current value becomes smaller than the target current value at the time t57, the charge mode C is set. Subsequently, when the excitation current value reaches the target current value at a time t58 after the time t57 and before the time t3, the operation mode of the driving circuit 40 becomes the low-speed attenuation mode Ds. Thereafter, when the time t3 arrives, the hold time period ends.

In this way, in the first setting operation, the high-speed attenuation mode Df is set in accordance with the condition. Consequently, even when it is not possible to reduce the excitation current value along the target current value by only setting the operation mode at the low-speed attenuation mode Ds, it is possible to decrease the excitation current value smoothly along the target current value.

Figure 14:
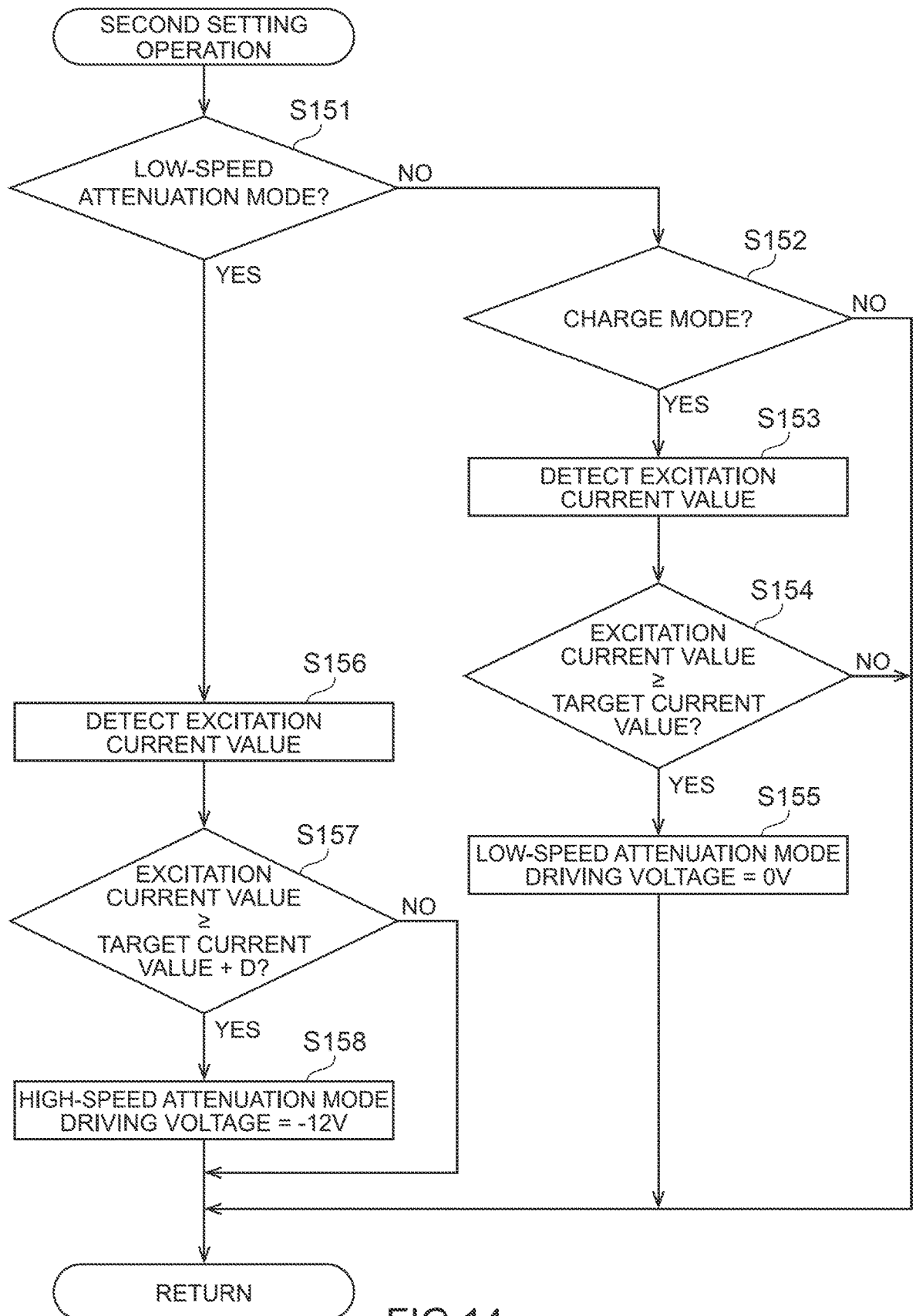
FIG. 14 is a flowchart showing a second setting operation according to a second modification of the present embodiment.

FIG. 14 is a flowchart showing a second setting operation according to a second modification of the present embodiment.

In the present modification, a control circuit 30 sets an operation mode of a driving circuit 40 at a high-speed attenuation mode when a magnitude of an excitation current becomes larger than a target current value by a predetermined value D or more in a hold time period. When the driving circuit 40 is in a charge mode, the control circuit 30 sets the driving circuit 40 to a low-speed attenuation mode when an excitation current value reaches the target current value, but there may be a case where the excitation current value does not decrease so much. When the magnitude of the excitation current is larger than the target current value by the predetermined value D or more in the case like this, it is possible to bring the magnitude of the excitation current close to the target current value quickly by setting the operation mode at the high-speed attenuation mode.

As shown in FIG. 14, in the second setting operation, in step S151, the control circuit 30 determines whether or not the operation mode of the driving circuit 40 is the low-speed attenuation mode. When the operation mode is the low-speed attenuation mode (YES), the control circuit 30 proceeds to step S156, and when the operation mode is not the low-speed attenuation mode (NO), the control circuit 30 proceeds to step S152.

Processing from step S152 to step S155 is similar to the processing from step S51 to step S54 in FIG. 9 described above.

In other words, in step S152, the control circuit 30 determines whether or not the operation mode of the driving circuit 40 is the charge mode. When the operation mode of the driving circuit 40 is the charge mode (YES), the control circuit 30 proceeds to step S153, and when the operation mode of the driving circuit 40 is not the charge mode (NO), the second setting operation ends.

In step S153, the control circuit 30 detects the excitation current value.

In step S154, the control circuit 30 determines whether or not the excitation current value is the target current value at this time point stored in the memory 33 or more. When the excitation current value is the target current value or more (YES), the control circuit 30 proceeds to step S155, and when the excitation current value is not the target current value or more (NO), the second setting operation ends.

In step S155, the control circuit 30 sets the operation mode of the driving circuit 40 at the low-speed attenuation mode.

On the other hand, processing from step S156 is as follows. In step S156, the control circuit 30 detects the excitation current value.

In step S157, the control circuit 30 determines whether or not the excitation current value is larger than the target current value at this time point by the predetermined value D or more, that is, whether or not the excitation current value is larger than a value obtained by adding the predetermined value D to the target current value. When the excitation current value is larger than the value obtained by adding the predetermined value D to the target current value (YES), the control circuit 30 proceeds to step S158, and when the excitation current value is not larger than the value obtained by adding the predetermined value D to the target current value (NO), the second setting operation ends.

In step S158, the control circuit 30 sets the operation mode of the driving circuit 40 at the high-speed attenuation mode. In other words, the driving voltage that is applied to the coils 124 by the driving circuit 40 is made minus 12 volts.

Figure 15:
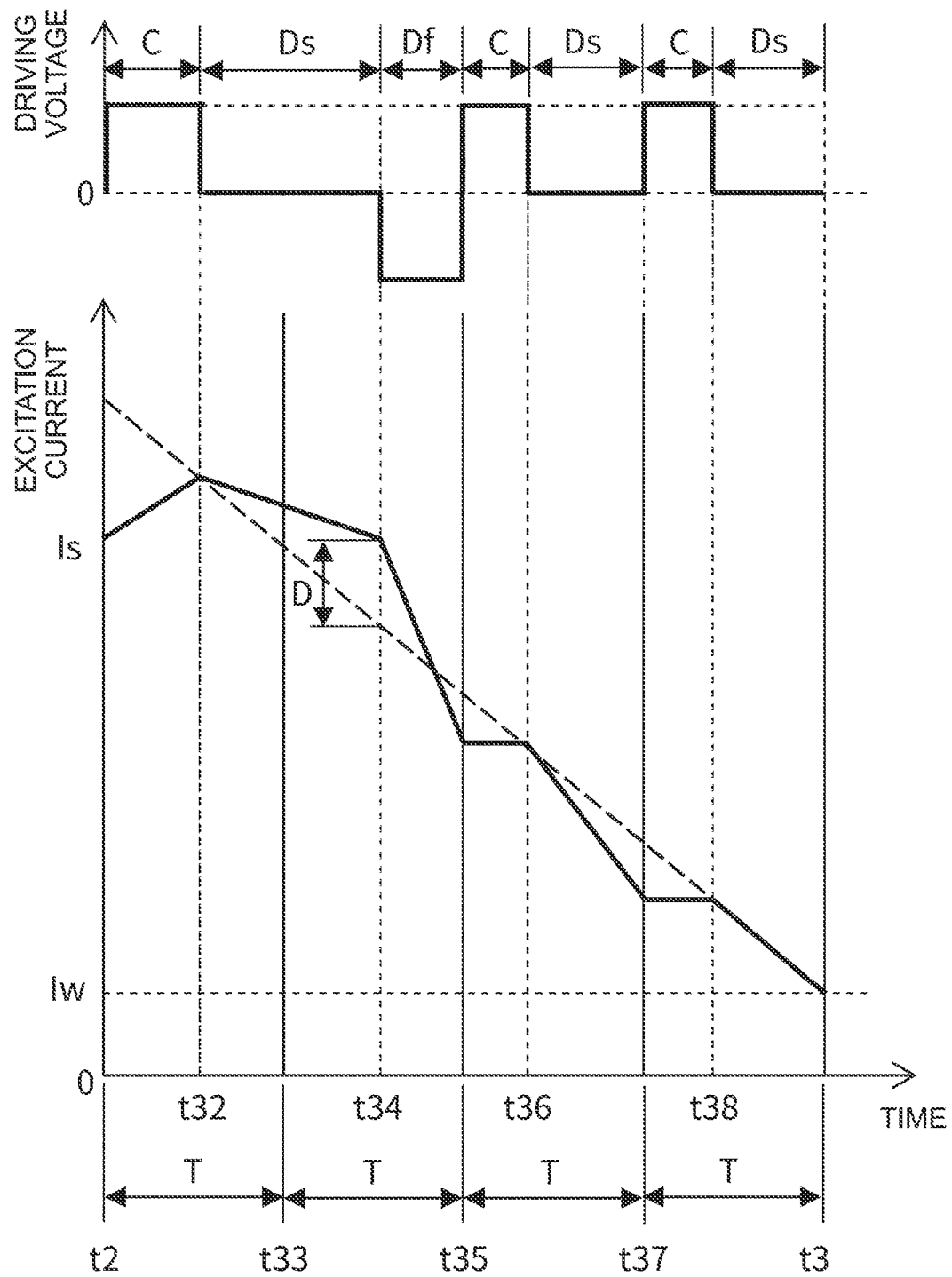
FIG. 15 is a diagram showing an operation of a control device at a time of hold control being performed in the second modification.

FIG. 15 is a diagram showing an operation of a control device 10 at a time of hold control being performed in the second modification.

In FIG. 15, a transition of the excitation current in a hold time period from a time t2 to a time t3 is schematically shown. The control circuit 30 changes a magnitude of the excitation current so that the magnitude of the excitation current becomes close to a target current value shown by a broken line. In FIG. 15, each of time periods from the time t2 to a time t33, from the time t33 to a time t35, from the time t35 to a time t37, and from the time t37 to the time t3 is a time (period T) of one period of a PWM period. Note that it is assumed that in the second modification, a first setting operation is performed in a same way as in the aforementioned embodiment.

At the time t2, the excitation current value is smaller than the target current value, and therefore the operation mode of the driving circuit 40 is the charge mode C. In that case, a driving voltage is applied to the coils 124, and the excitation current value increases.

At a time t32 after the time t2 and before the time t33, the excitation current value reaches the target current value. In that case, the operation mode of the driving circuit 40 becomes a low-speed attenuation mode Ds. Thereafter, the driving voltage is not applied until the time t33 at which the PWM period ends, and therefore the excitation current value decreases.

At the time t33 at which a next PWM period starts, the excitation current value is larger than the target current value, and therefore the operation mode of the driving circuit 40 becomes the low-speed attenuation mode Ds. In other words, the operation mode of the driving circuit 40 is kept at the low-speed attenuation mode Ds.

Here, at a time t34 that is in the low-speed attenuation mode Ds, and is after the time t33 and before the time t35, the excitation current value reaches a value obtained by adding the predetermined value D to the target current value. In other words, at the time t34, the excitation current value is larger than the target current value, and a difference between the excitation current value and the target current value is the predetermined value D. In that case, the operation mode of the driving circuit 40 is set at a high-speed attenuation mode Df. The high-speed attenuation mode Df continues until the time t35 at which at least the PWM period ends.

At the time t35, the excitation current value is smaller than the target current value. Therefore, the charge mode C is set. Subsequently, when the excitation current value reaches the target current value at a time t36 after the time t35 and before the time t37, the operation mode of the driving circuit 40 becomes the low-speed attenuation mode Ds.

Thereafter, when the excitation current value becomes smaller than the target current value at the time t37, the charge mode C is set. Subsequently, when the excitation current value reaches the target current value at a time t38 after the time t37 and before the time t3, the operation mode of the driving circuit 40 becomes the low-speed attenuation mode Ds. Thereafter, when the time t3 arrives, the hold time period ends.

In this way, in the second setting operation, the high-speed attenuation mode Df is set in accordance with the condition. Therefore, even in a case where it is impossible to reduce the excitation current value to be along the target current value by only setting the operation mode at the low-speed attenuation mode Ds, it is possible to decrease the excitation current value smoothly along the target current value. It is possible to decrease the magnitude of the excitation current greatly to bring the excitation current close to the target current value when the magnitude of the excitation current exceeds the target current value greatly by the predetermined value or more, by switching the operation mode from the low-speed attenuation mode Ds to the high-speed attenuation mode Df until one period ends from predetermined timing in the one period.

In the modification as described above, it is possible to decrease the excitation current value quickly by setting the operation mode of the driving circuit 40 at the high-speed attenuation mode according to a situation. Accordingly, it is possible to set the target current value so as to decrease relatively abruptly, and it is possible to shorten the hold time period.

Note that in the embodiment of the present invention described above, in the hold control, the driving circuit 40 is set to the operation mode of either the low-speed attenuation mode or the charge mode, without using the high-speed attenuation mode as in the modifications. In this case, it is possible to decrease the excitation current value gradually in such a manner that the excitation current value is along the target current value, and it is possible to reduce generation of vibration and noise at the rotation stopping time of the stepping motor 20. In the case of using the high-speed attenuation mode, vibration and noise of the stepping motor 20 may be generated just before the rotation of the rotor stops while it is possible to decrease the excitation current abruptly (However, even in the case of using the high-speed attenuation mode, it is possible to suppress generation of vibration and noise more than in the case of not performing the hold control like this.). On the other hand, in the case of not using the high-speed attenuation mode, it is also possible to suppress vibration and noise of the stepping motor 20 more just before the rotation of the rotor stops.

The features of the embodiment and the modifications described above may be partially combined to form a motor. In the embodiment and the modifications described above, some of the constituent elements do not have to be provided, or some of the constituent elements may be formed in other forms. For example, both the first setting operation and the second setting operation according to the aforementioned first modification may be performed at the time of the hold control.

Others

An embodiment in which the aforementioned plurality of embodiments are properly combined may be formed. For example, not limited to the configuration of the aforementioned embodiment, respective constituent elements of the aforementioned embodiment may be properly replaced or combined with constituent elements of the other embodiments. Further, in the aforementioned embodiment, some of the constituent elements and functions may be omitted.

FETs are applied in the above described embodiment as the switching elements forming the H bridge circuit, but instead of FETs, bipolar transistors, IGBT (insulation gate bipolar transistors), and other switching elements may be applied.

Further, in the above described embodiment, the example in which a bipolar type two phase stepping motor is applied as the motor is explained, but various kinds of motors and various numbers of phases may be applied according to the use purpose.

The present invention is not limited to the respective configurations of the aforementioned embodiments. The respective features of the respective embodiments may be properly combined to form the control device for the stepping motor. The block diagrams of the control device and the like are only specific examples, and it is possible to adopt various configurations.

The processes in the aforementioned embodiments may be performed by software or may be performed by using a hardware circuit. Concerning the operations shown in the aforementioned flowcharts, an order of the respective processes and specific process contents are not limited to what is described above, but may be properly changed to operate similarly as a whole, or a process may be added.

It should be understood that the above described embodiments are illustrative and non-restrictive in every respect. The scope of the present invention is shown by the claims, rather than the description above, and is intended to include all changes within the meaning and the scope equivalent to the claims.

LIST OF REFERENCE SIGNS 2, 4, 6, 8 switching element
10 control device
12, 14, 16, 18 diode
20 stepping motor
30 control circuit (one example of control unit, one example of hold control unit)
31 CPU
32 current measuring unit
33 memory
40 driving circuit (one example of driving unit)
41 motor driving unit
42 current sensing unit
45 H bridge circuit
124 coil
C charge mode
Ds low-speed attenuation mode (one example of first attenuation mode)
Df high-speed attenuation mode (one example of second attenuation mode)
Is start current value
Iw standby current value

The invention claimed is:

1. A control device for a stepping motor that causes an excitation current to flow in a plurality of coils to rotate a rotor, comprising:
 a driving circuit that includes a switching element and applies a driving voltage to the coils; and
 a control circuit that controls the driving voltage that is applied by the driving circuit,
 wherein the control circuit performs hold control to move the rotor to a predetermined stop position by changing a magnitude of the excitation current flowing in the coils so that the magnitude of the excitation current becomes close to a target current value that gradually decreases, in a hold time period at a rotation stopping time of the stepping motor,
 the control circuit sets an operation mode of the driving circuit at an operation mode corresponding to a comparison result of the magnitude of the excitation current and the target current value, of a plurality of operation modes, at each of predetermined periods in the hold time period, and
 the plurality of operation modes include a charge mode to increase the excitation current and a first attenuation mode to attenuate the excitation current.

2. The control device for a stepping motor according to claim 1, wherein the control circuit sets the operation mode of the driving circuit at an operation mode corresponding to a predetermined condition, of the plurality of operation modes, when the comparison result of the magnitude of the excitation current and the target current value satisfies the predetermined condition in the hold time period.

3. The control device for a stepping motor according to claim 1, wherein the control circuit sets the operation mode of the driving circuit at the charge mode, in a case where the magnitude of the excitation current is smaller than the target current value, at each of the predetermined periods.

4. The control device for a stepping motor according to claim 1, wherein the control circuit sets the operation mode of the driving circuit at the first attenuation mode, in a case where the magnitude of the excitation current is larger than the target current value, at each of the predetermined periods.

5. The control device for a stepping motor according to claim 1, wherein the control circuit sets the operation mode of the driving circuit at the first attenuation mode, when the magnitude of the excitation current reaches the target current value, in a case where the operation mode of the driving circuit is the charge mode.

6. The control device for a stepping motor according to claim 1, wherein the plurality of operation modes further include a second attenuation mode that attenuates the excitation current at a higher speed than the first attenuation mode.

7. The control device for a stepping motor according to claim 6, wherein the control circuit sets the operation mode of the driving circuit at the second attenuation mode, in a case where the magnitude of the excitation current is larger than the target current value, at each of the predetermined periods.

8. The control device for a stepping motor according to claim 6,
 wherein the control circuit sets the operation mode of the driving circuit at the second attenuation mode, in a case where the operation mode of the driving circuit is the first attenuation mode in an entire time period of a previous period, when the magnitude of the excitation current is larger than the target current value, at each of the predetermined periods, and
 sets the operation mode of the driving circuit at the first attenuation mode, in a case where the operation mode of the driving circuit is the operation mode other than the first attenuation mode in a partial time period in a previous period.

9. The control device for a stepping motor according to claim 6, wherein the control circuit sets the operation mode of the driving circuit at the second attenuation mode, when the magnitude of the excitation current becomes larger than the target current value by a predetermined value or more in the hold time period.

10. The control device for a stepping motor according to claim 1,
 wherein the control circuit outputs a PWM (Pulse Width Modulation) signal to the driving circuit to perform control of the driving voltage, and
 the predetermined period is a PWM period of the PWM signal.

11. A control method for a stepping motor that rotates a rotor by applying a driving voltage to a plurality of coils by a driving circuit including a switching element, and causing an excitation current to flow in the plurality of coils, comprising:
 a normal control step of controlling the driving voltage at a normal driving time of the stepping motor; and
 a hold control step of performing hold control to move the rotor to a predetermined stop position by changing a magnitude of the excitation current flowing in the coils so that the magnitude of the excitation current becomes close to a target current value that gradually decreases, in a hold time period at a rotation stopping time of the stepping motor,
 wherein the hold control step causes the driving circuit to operate in an operation mode corresponding to a comparison result of the magnitude of the excitation current and the target current value, of a plurality of operation modes, at each of predetermined periods in the hold time period, and the plurality of operation modes include a charge mode to increase the excitation current and a first attenuation mode to attenuate the excitation current.

\* \* \* \* \*